Dec. 27, 1949    P. M. DURBEN    2,492,468
BEE FEEDER
Filed Feb. 17, 1949

Peter M. Durben
INVENTOR

BY C. A. Snow & Co.
ATTORNEYS

Patented Dec. 27, 1949

2,492,468

UNITED STATES PATENT OFFICE 2,492,468

BEE FEEDER

Peter M. Durben, Hilbert, Wis.

Application February 17, 1949, Serial No. 76,967

2 Claims. (Cl. 6—5)

This invention relates to bee feeders. More particularly, the invention has reference to a bee feeder of novel formation.

An important object of the invention is to provide a bee feeder which will not overflow when in use.

Another important object is to provide a bee feeder so designed that no bees will be lost through drowning in the fluid contained in the feeder.

Another important object is to provide a bee feeder having a surface which will not retard, but which will in fact help the locomotion of the bees when they have their wings and body covered with the syrupy fluid in which they feed.

Another important object is to provide a bee feeder of simple yet novel design, that can be constructed at a minimum of expense, and which will be capable of use over an indefinite period of time without possibility of getting out of order.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 1:
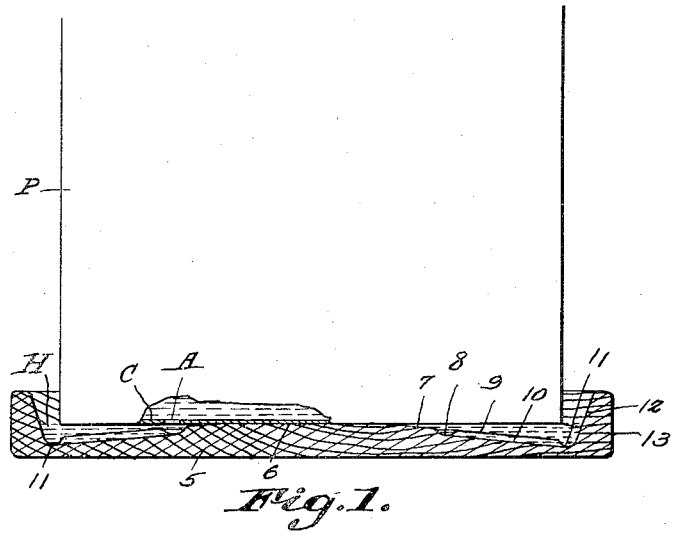
Figure 1 is a vertical section taken diametrically through the bee feeder of the invention, a honey pail supported by the bee feeder being illustrated in operative relationship therewith.
Figure 2:
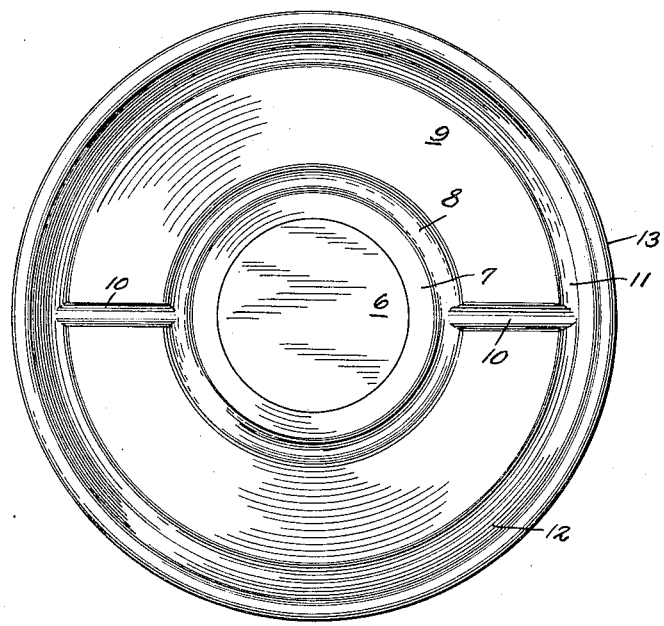
Figure 2 is a top plan view.

Referring to the drawings in detail, the bee feeder is constructed from a circular piece of stock, preferably wood. It is preferred that wood be used rather than metal, because when a bee has its wings and body covered with a syrupy fluid, such as that which the bee would be feeding on in the feeder, it has a difficult time making any progress on a metal surface. A wooden surface, on the other hand, does not, I have found, retard the locomotion of the bees when they are in this condition, but on the contrary helps the bees. As a result, the possibility of the bee slipping on a metal surface and drowning in the fluid is avoided.

The bee feeder of the invention is formed with a flat bottom surface 5. The top of the bee feeder, however, is of a special formation, as will be described.

In this connection, the feeder is provided with a circular central plane surface 6, of rather small diameter as compared to the overall diameter of the feeder, and this plane surface is for the purpose of supporting steadily the honey pail P supported by the feeder.

At its margin, the central plane surface 6 merges into an annular surrounding downwardly inclined surface 7. The incline of this surface is only very slight. This in turn merges into and is surrounded by an annular inner groove 8, which in turn is surrounded by a substantially wide downwardly inclined surface 9. The surfaces 7 and 9, in fact, can be considered as comprising a single wide slope surrounding the center plane surface 6 and extending from the margin of said plane surface to the periphery of the bee feeder in a gradual downward inclination, with said slope having formed in it the groove 8. Traversing the slope, and disposed radially of the bee feeder, are diametrically opposed connecting grooves 10, each of which communicates at one end with the inner groove 8, and at the other end with an outer groove 11 that surrounds the slope 9. The outer groove 11, in turn, merges into the steeply and upwardly inclined inner surface 12 of an upstanding peripheral flange 13 on the feeder. Said peripheral flange extends higher than any other part of the top of the feeder, as readily seen from Figure 1.

During the cold weather months of the year, bees must be fed. Usually, there are from 5,000 to 6,000 bees in a hive during the winter time. Such a colony would increase to 80,000 or 90,000 during the honey making season.

A bee hive is usually contained in a square or rectangular box, as is well known. In cold weather the top of the box is removed. The bee feeder constructed as described above is then placed upon the top surface of the comb. The feeder constructed to support a honey pail of standard size, such as a 10 lb. honey pail, and such pail will contain the usual honey, syrup, or any fluid suitable for bee food.

In use, an aperture A is punched in the cover of the pail P. The pail is then inverted and placed in the bee feeder.

The aperture A, in this connection, is so located as to be spaced from the plane surface 6 of the bee feeder. In the present instance, it will be noted that the aperture A is disposed substantially above the inner groove 8. In any event, honey or other syrupy liquid H moves out of the aperture A and will of course flow outwardly into the outer groove 11. The honey will fill the outer groove to the exact level of the cover or end wall C of the pail P, said level being readily noted in Figure 1.

It is in the space between the inner surface 12 of the upstanding flange 13, and the outer periphery of the pail P, generally amounting to approximately 3/8 of an inch, that the bees feed. In this connection, it has been found that bees will not be lost by drowning in the feeder, by reason of the wood construction thereof, as previously discussed herein.

As long as there is any fluid within the pail, the level of the honey H will be as illustrated, until the pail is empty. Then, the last of the fluid will all flow into the inner groove 8, and will move from said inner groove into the connecting grooves 10, down the slope, and into the outer groove 11.

What is claimed is:

1. A bee feeder of substantially dished out conformation, said bee feeder having an upper surface formed centrally with a plane surface for supporting a honey pail, said plane surface merging into a surrounding gradually and downwardly inclined slope, there being an inner groove formed in the slope and concentric with the plane surface, there being an outer groove formed at the foot end of the slope and surrounding the same, there being connecting grooves extending between the inner and outer grooves, and an upstanding peripheral flange into which the outer groove merges, said upstanding flange extending higher than any other portion of the upper surface of the bee feeder.

2. A bee feeder comprising a circular piece of wood material having an upper surface dished out and formed with a center plane surface for supporting a honey pail, a gradually and downwardly inclined slope surrounding the plane surface, concentric annular grooves formed in the slope, there being radial connecting grooves extending between the concentric grooves, and an upstanding peripheral flange surrounding the slope and grooves, said flange extending higher than any other portion of the upper surface of the bee feeder, the inner surface of said flange being disposed at a steep incline.

PETER M. DURBEN.

REFERENCES CITED

The following references are of record in the file of this patent:

UNITED STATES PATENTS

| Number | Name | Date |
| --- | --- | --- |
| 34,516 | Brown | June 21, 1859 |
| 1,035,817 | Benson | Aug. 13, 1912 |
| 1,426,701 | Achenbach | Aug. 22, 1922 |
| 1,859,738 | Boyer | May 25, 1932 |
| 1,114,638 | Nordquist | Oct. 20, 1932 |
| 2,324,020 | Pinson | July 13, 1943 |